US012792767B1

(12) United States Patent
Haslam et al.

(10) Patent No.: US 12,792,767 B1
(45) Date of Patent: Nov. 10, 2026

(54) SYSTEMS AND METHODS FOR PERSONAL DATA ANALYSIS AND PROTECTION

(71) Applicant: United Services Automobile Association (USAA), San Antonio, TX (US)

(72) Inventors: Justin Dax Haslam, San Antonio, TX (US); Jose L. Romero, Jr., San Antonio, TX (US); Arthur Quentin Smith, Fredericksburg, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 919 days.

(21) Appl. No.: 17/500,473

(22) Filed: Oct. 13, 2021

Related U.S. Application Data

(60) Provisional application No. 63/093,492, filed on Oct. 19, 2020.

(51) Int. Cl.

| | |
|---|---|
| ***G06Q 10/40*** | (2026.01) |
| ***G06F 21/62*** | (2013.01) |
| ***G06V 20/62*** | (2022.01) |
| ***G06V 30/262*** | (2022.01) |

(52) U.S. Cl.
CPC ......... *G06F 21/6245* (2013.01); *G06Q 10/40* (2026.01); *G06V 20/62* (2022.01); *G06V 30/262* (2022.01)

(58) Field of Classification Search
CPC ..... G06F 21/6245; G06Q 50/01; G06Q 10/40
See application file for complete search history.

(56) References Cited

U.S. PATENT DOCUMENTS

| | | | | |
|---|---|---|---|---|
| 10,671,693 | B1 * | 6/2020 | Raley | H04L 67/306 |
| 11,019,090 | B1 * | 5/2021 | Smith | G06F 21/40 |
| 2011/0276602 | A1 * | 11/2011 | Terada | G06Q 10/10 707/784 |
| 2013/0007029 | A1 * | 1/2013 | Ziemann | G06F 16/00 707/758 |
| 2013/0117281 | A1 * | 5/2013 | Fleet | G06Q 30/02 707/748 |
| 2016/0191636 | A1 * | 6/2016 | Healey | H04W 4/029 709/205 |
| 2017/0118642 | A1 * | 4/2017 | Fukui | H04W 12/068 |

OTHER PUBLICATIONS

Bijoy, Jina Marin, V. K. Kavitha, B. Radhakrishnan, and L. Padma Suresh. "A graphical password authentication for analyzing legitimate user in online social network and secure social image repository with metadata." 2017, International Conference on Circuit, Power and Computing Technologies (ICCPCT) (Year: 2017).*

* cited by examiner

*Primary Examiner* — E Carvalho
(74) *Attorney, Agent, or Firm* — Fletcher Yoder P.C.

(57) ABSTRACT

Provided is a personal data analysis and protection system that may include a user privacy tool. The user privacy tool may operate to evaluate or identify that a user password or proposed password overlaps with existing social media content or user private data. The user privacy tool may operate to evaluate user social media content or user private data that may be potentially compromising based on the user's existing set of passwords in use on various platforms or services.

14 Claims, 4 Drawing Sheets

SYSTEMS AND METHODS FOR PERSONAL DATA ANALYSIS AND PROTECTION

CROSS-REFERENCE TO RELATED APPLICATION

The present application claims benefit of and priority to U.S. Provisional Patent Application Ser. No. 63/093,492, titled "Personal Data Analysis and Protection," which was filed on Oct. 19, 2020, and which is herein incorporated by reference in its entirety for all purposes.

BACKGROUND

The present disclosure relates generally to providing privacy protection for personal data usage. More specifically, the present disclosure relates to analyzing privacy data exposure and providing privacy reports to facilitate preventing or resolving privacy concerns.

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

Data privacy is of concern for users of social networking platforms, e.g., social media. Users may inadvertently reveal personal data that jeopardizes security protections for banking or other private applications. In response to emerging privacy concerns for their users, organizations (e.g., companies) may be pressed to provide improved personal data protection for their clients.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system may include a user device in communication with a social network platform and a user privacy tool. The user privacy tool may include a processor comprising instructions stored thereon that, when executed by a processor, cause the processor to receive updated social network content of the user; extract data from the social network content; flag extracted data in the social network content associated with privacy concerns; and generate a privacy report related to the flagged extracted data.

In one embodiment, a system may include a user privacy tool comprising a processor with instructions stored thereon that, when executed by a processor, cause the processor to: receive a password or proposed password of a user; identify that the password or proposed password overlaps with existing social media content or user private data; and generate an indication relating to the overlap.

In another embodiment, a method includes receiving updated social network content associated with a user and extracting data from the social network associated with the user via a user privacy tool. Further, the method may include flagging, via the user privacy tool, one or more pieces of the extracted data associated with privacy concerns and generating, via the user privacy tool, and indication related to the flagged extracted data. Moreover, the method may include transmitting the indication related to the flagged extracted data to a user device.

In yet another embodiment, a non-transitory, computer readable medium storing instructions is provided. The instructions, when executed by one or more processors, may be configured to cause the one or more processors to receive a list of current passwords or a proposed password associated with a user and extract data from social network content associated with the user via a user privacy tool. The instructions may also cause the one or more processors to identify information from the extracted data is present within one or more passwords within the list of current passwords or the proposed password associated with the user and flag the one or more passwords within the list of current passwords or the proposed password that contain information from the extracted data. Further, the instructions may cause the one or more processors to generate an indication related to the flagged passwords.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
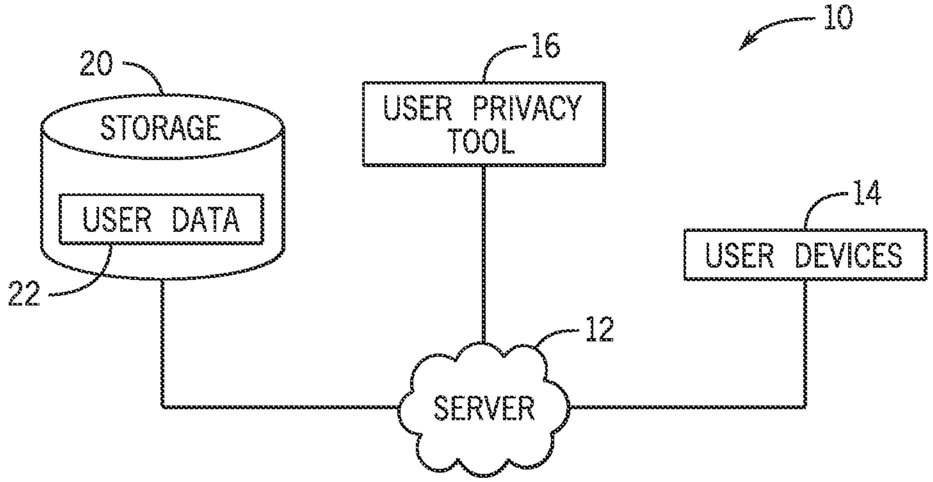
FIG. 1 illustrates a schematic diagram for a personal data analysis and protection system, in accordance with embodiments described herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions are made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. It should be noted that the term "multimedia" and "media" may be used interchangeably herein.

With social networks (e.g., social media) becoming more widespread, more people are drawn to create personal content with potentially compromising and publicly available information on social networks. The content generated and posted by a user or someone in their social network (e.g., friends or family) on a social network and available to authorized viewers (e.g., friends in a social sphere) or publicly available to all can provide potential sources of private data to break (e.g., hack) passwords. For example, a social network user may update their profile to include their birthdate, and may also have a family photo with their respective family members tagged. The names of the family members in the photo would then be viewable by anyone with access to the post. If the user's password contained their birthdate as well as a family member's name, then the user's profile could be compromised. Provided herein is a personal data analysis and protection system that analyzes, monitors, and/or analyzes user data, which may be data generated by the user and/or data referring to the user on third party social networking content, for potential privacy breaches. In an embodiment, the system may include a password protection tool that analyzes social media content about the user to eliminate or flag compromising data. In another embodiment, the system may include a password evaluation tool that rejects or flags passwords that, based on available public user data, are more vulnerable to hacking.

With the foregoing in mind, in an embodiment, the personal data analysis and protection system can notify users of potentially problematic social media information included in the social network content of the user and/or offer a password evaluation tool that checks proposed or existing passwords against content available in the user's social network. The tool may also operate to generate additional security layers that bypass existing available content. For example, some security tools require that a user answer additional questions when using a new device as an additional security factor. These questions may be tailored to avoid content that is recognized as being compromised by social media of the user (e.g. "What is the name of your high school?"). Further, the tool may indicate a level of existing privacy settings associated with the potentially compromising content (e.g., publicly available, semi-public, friends only).

In certain embodiments of the present techniques, the personal data analysis and protection system disclosed herein may additionally or alternatively be applied to stored or non-publicly available user information that is not necessarily part of social media content but that may be vulnerable to infiltration. For example, users may inadvertently permit third parties to access private stored information through insufficiently stringent privacy settings, such as inadvertent sharing of vital documents on the cloud. As personal and commercial use of computers, and "smart devices" (e.g., smart home monitoring devices), becomes more widespread, the need for personal data storage, both local and remote (e.g., cloud-based) has increased. Further, local storage devices (e.g., mobile devices, laptops, smart devices) on which private data is stored may be hacked or stolen. To ensure personal data within the storage is secure, the password and/or data privacy techniques may also be used to identify personal data that may, if compromised, reveal information that would jeopardize user passwords or challenge-response questions. The disclosed techniques may be used to evaluate password security in the context of private user data, (e.g., resumes, photos, texts, etc.) which may be data that is stored locally on a user device or may be data that is stored by cloud or other remote services, but that is associated with or owned by the user. This password protection tool may operate to analyze private data to eliminate or flag compromising data.

The benefits of the disclosed techniques include, but are not limited to, stronger passwords, greater privacy security, and alerts to the user of potentially problematic social network and/or private data and information. In an embodiment, the disclosed techniques may be implemented as a tool that is administered by a separate entity than a social network platform such that the flagged social network content information is only visible to the user of the tool and such that the administrator of the social network does not have access to the user passwords as part of the analysis. The tool may additionally or alternatively be applied to personal information stored locally or in the cloud that may be targets to exploit for social engineering/password hacking.

The third party analyzing tool may generate a security report based on the content in a user's social network or content stored locally or on a remote server (e.g. the cloud). The generated security report may include at least improved password suggestions, rejected weak passwords, an avoidance list of words, numbers, letters, digits, and symbols to avoid using, and flagged private data. Additionally, details with regard to analyzing privacy data exposure, along with other technologies for consolidating privacy data exposure associated with the clients/users into privacy reports, will be discussed in detail below with reference to FIGS. 1-6.

FIG. 1 illustrates a block diagram of a personal data analysis and protection system 10. The system 10 may include a server 12 (e.g., one or more servers of a cloud computing environment), user devices 14, a user privacy tool 16, and user storage 20, e.g., a database, where user data 22 may be stored. The server 12, user devices 14, user privacy tool 16, and user database 20 may communicate with each other using a variety of communication protocols. The communication protocols may include Open Database Connectivity (ODBC), TCP/IP Protocol, Distributed Relational Database Architecture (DRDA) protocol, Database Change Protocol (DCP), HTTP protocol, other suitable current or future protocols, or combinations thereof.

The server 12 may be a server operated by a third-party organization (e.g., a bank, an insurance company, or a financial group). For example, the server 12 may be a private server, such as local area network (LAN) that includes a variety of computing and server devices including, but are not limited to, switches, servers (e.g., processors), storage (e.g., memory) and routers. Further, the server 12 may be a cloud-based server. The server 12 may include restrictions and access rules established in order to relegate access to selected users (e.g., clients, employees, third party service providers, regulatory representatives). The organization may use the server 12 to provide a variety of services for the clients. In some embodiments, the server 12 may actually be off premises (e.g., in a cloud or the like). The server 12 may include service/application servers, data servers, databases, and other server devices such as gateways, switches and routers.

Figure 2:
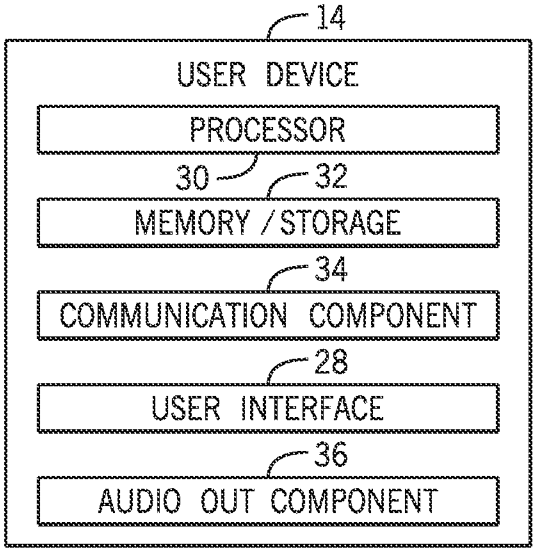
FIG. 2 illustrates a block diagram of a user privacy tool of the system of FIG. 1, in accordance with embodiments described herein.

FIG. 2 is a block diagram of an embodiment of a user device 14 of the system 10. A user may access and/or interact with the user privacy tool 16 operating on the user device 14 via a user interface 28, such as a graphical user interface (GUI) or via an audio command interface that facilitates interaction (e.g., audio user inputs, audio device feedback) with the user device 10. A user device 14 may include various types of components that may assist the user device 14 in performing various types of computing tasks and operations. For example, a user device 14 may be any electronic device comprising at least a processor 30, a memory 32, a communication component 34, a user interface 28, an audio output component 36, or any combination thereof. Further, it should be understood that certain components of the user device 14 depicted in FIG. 2, such as the processor 30, the memory 32, the communication component 34, the user interface 28, and an audio output component 36 may be present in other components of the system 10.

The processor 30 of the user device 14 may be any type of computer processor or microprocessor capable of executing computer-executable code. The processor 30 may also include multiple processors that may perform the operations described below.

The memory 32 component may be any suitable articles of manufacture that can serve as media to store processor-executable code, data, or the like. These articles of manufacture may represent computer-readable media (e.g., any suitable form of memory or storage) that may store the processor-executable code used by the processor 30 to perform the presently disclosed techniques. As used herein, applications may include any suitable computer software or program that may be installed onto the user device 14 and executed by one or more processors 30 of user device 14. It should be noted that non-transitory merely indicates that the media is tangible and not a signal.

The user privacy tool 16 may be downloaded and stored in the memory 32 of the user device 14 or may be stored at least in part on the server 12 and accessed via the user device 14. A user privacy report 180 as disclosed herein may also be stored in the memory 32 of the user device 14. It should be noted that a plurality of privacy reports may be generated by the user privacy tool 16, and then stored in the memory 32 of the user device 14.

The user device 14 may comprise a communication component 34 that may be configured to communicate with a server 12. The communication component 34 may facilitate communication between the user device 14 and the server 26 via a server such as the Internet, or the like. The server 12 may communicate with the data storage 20 to access user data 22 (see FIG. 1). The user data 22 may include a user's previous passwords, alphanumeric pins, or a plurality of user privacy reports. The user data may also include social network data, such as social network postings, user actions (likes, favorites, reposts, subscribes), photos, etc. The user data may also include user personal data, such as data stored in the cloud or stored locally and accessible by the system 10.

Figure 5:
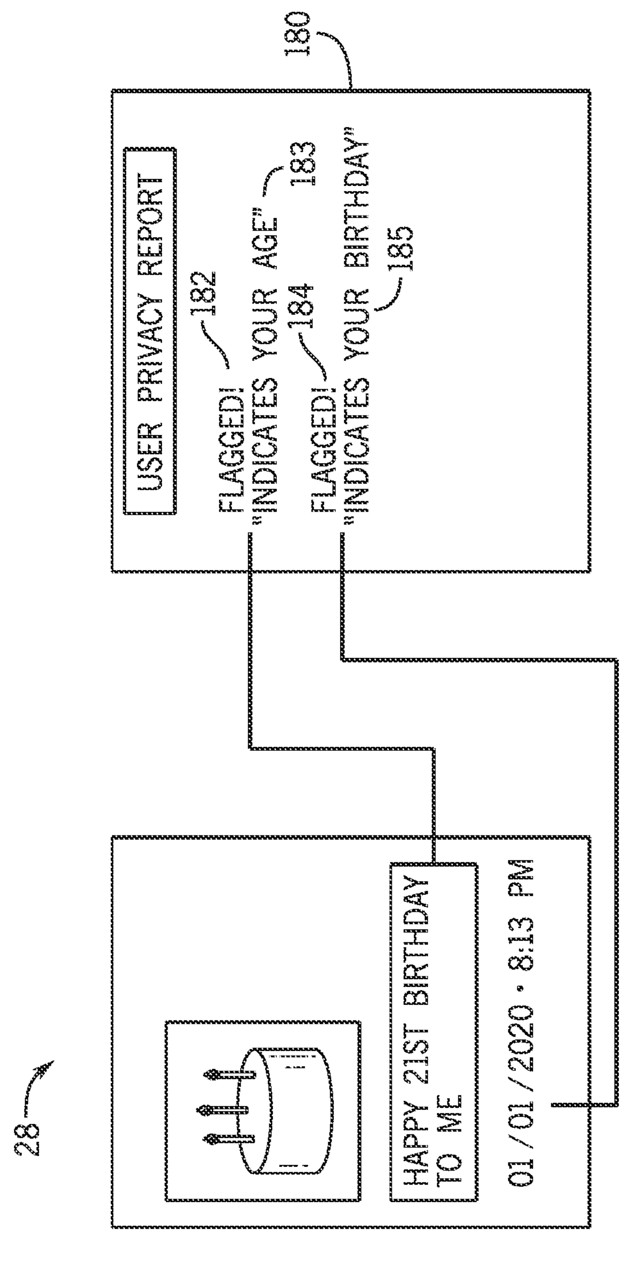
FIG. 5 illustrates an example of a user privacy report that may be created using the system of FIG. 1, in accordance with embodiments described herein.

The user device 14 may also operate to display the user interface 28 and permit user actions, such as user input, to the user interface 28. The user interface 28 may present graphics to the user (e.g., a user privacy report 180) as shown in FIG. 5 and described below. The user interface 28 may allow a user to be presented with alerts that flag potentially compromising information. Along with displaying the user interface 28, the user device may also present the same information that is presented via graphic, as described above, through an audio output component 36.

In some embodiments, the user privacy tool 16 may operate as a software application on the user device 14 or a web browser mediated application. The user privacy tool 16 may be accessed via an input received by the user interface 28 of the user device 14. For example, upon receiving the input to access the user privacy tool 16, the user device 14 may communicate with the server 12 via the communication component 34. The server 12 may then retrieve the user data 22 from the storage 20 to transmit to the user privacy tool 16. The user privacy tool 16 may carry out one or more processes based upon the initial input to the user device 14. The user privacy tool 16 may then transmit the results of the one or more processes to the user device 14, via the server 12.

Figure 3:
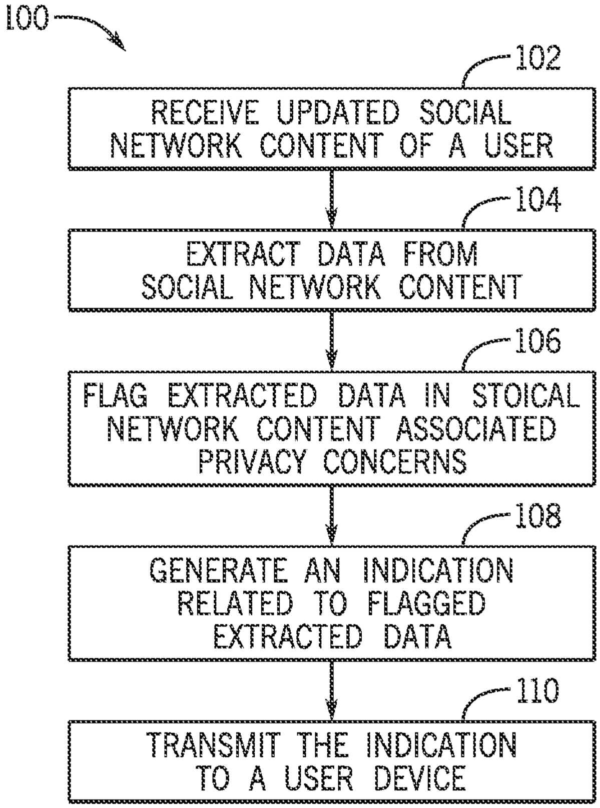
FIG. 3 illustrates a flow diagram of a method for flagging potentially compromising data present on a social network using the system of FIG. 1, in accordance with embodiments described herein.

FIG. 3 is a flow diagram of an embodiment of a process 100 for flagging potentially compromising data present on a social network. The process 100 may be performed by one or more components of the system 10 and may be at least in part performed by separate components of the system 10. In one example, the process is initiated via interactions of the user with the user device 14.

The process 100 may include receiving updated social network content, as indicated by block 102. The updated social network content may be received by the user device 14 via a communication component 34 and may be stored in the memory of the user device 14. The social network content may include social media posts, photos, etc. In an embodiment, the updated social network content is a new post or social network action by the user performed on one or more user devices 14.

The system 10 may receive the social network content from one or more individual social network platforms. Social network platforms may include, by way of example, Facebook, Instagram, LinkedIn, Twitter, Youtube or other video-sharing platforms, Tumblr, Bumble, etc. The system 10 receives the information from all social network platforms selected by user via the user device 14 (e.g., via an opt-in setting) to be accessed by the system 10. Additionally or alternatively, the system 10 may operate to scrape publicly available data without user selection or opt-in. By assessing social network content from a variety of social network platforms, the user receives a full picture of the potential privacy breaches and password vulnerabilities that are created by the user's amalgamated publicly available information. The system 10 may have settings that permit the user to tune the viewing stringency of the system. For example, the system 10 may function or operate to receive the user's social media content as a friend or as a member of the public to scrape existing and/or new social media content of a particular user from individual social network platforms. In an embodiment, the social media content is received from the social media platforms themselves. In an embodiment, the social media content is received from the one or more user devices 14. That is, the system 10 may operate to record or track interactions of the user on their own devices 14 with one or more social network platforms.

Upon receiving the social network content, the system 10, e.g., the user privacy tool 16, may extract data from the social network content, as indicated by block 104. In an embodiment, the data extraction is performed by a processor of the server 12. In an embodiment, the data extraction may be performed by the user device 14. While certain embodiments of the system 10 include communication between the server 12 and the user device 14, it should be understood that the method 100 may be performed locally on the user device 14.

The user privacy tool 16 may flag extracted data in the social network content associated with privacy concerns, as indicated by block 106, and as generally discussed herein. Additionally or alternatively, the user privacy tool 16 may evaluate the user's private data as part of the analysis. For example, the user privacy tool may assess stored photos or documents that are private to the user (i.e., stored in the memory/storage 32 of the user device 14) but that could be revealing if the user's private storage were compromised by theft or hacking, or if the data is not in the social sphere but could be discovered through other techniques, such as background checks or examination of city and county records. The user privacy tool 16 may be resident on the server 12, or on a remote server, different than that of server 12. The user privacy tool 16 may also be moderated by a third-party organization to deter any biases to keep some social network data secure over others.

The user privacy tool 16 may then generate a notification or report related to flagged extracted data, as indicated by block 108. Once the notification or report has been generated, the user privacy tool 16 may communicate with the server 12 to send the notification or report to the user device 14 and/or the database storage 20. Upon receiving a notification or report, the storage 20 may store the notification or report into the user data 22, resident on the storage 20. The user device 14 may also store a notification or report received from the user privacy tool 16 and store it into the memory 32 of the user device 14. Further, the user device 14 may also present the notification or report on the user interface 28 or report via an audio output component 36.

In one embodiment, the extracted data is text data in the social media content, such as text from a caption of a user-generated post, a user-tagged post, or text from a user comment on an article posted by a third party or on a post of a friend. In an embodiment, the extracted data is image data in the social media content, such as a photograph posted by the user or photographs posted by others in which the user is tagged. The flagged data may be identified by assessing an overlap or correlation between a set of preset content that is associated with privacy breaches, such as home or work addresses, automobile license plate information, school mascots, school names, birthdays, nicknames, maiden names of relatives, pet names, car brands, etc. For example, the present content may be the type of content commonly used for secondary authentication, e.g., "what is your mother's maiden name?" The flagged data may additionally or alternatively be identified by assessing an overlap or correlation between a set of one or more existing passwords of the user (e.g., stored in the user data 22 or locally on the user device 14) that are accessible to the system 10. The passwords may be passwords across various services and tools (online banking, shopping, ride sharing, dining, software applications, gaming, smart devices in the home) that the user interacts with, e.g., via the user device 14 or other devices. Based on the notification of flagged data, the user may wish to delete or modify the social media content or the passwords.

Certain types of conventional password evaluation may be offered at the time of password establishment and require that a password be of a particular strength based on filters of string length, upper and lowercase characters, and presence of special characters. However, such tools are generic to the general population and are not personalized. Further these tools are a one-time evaluation. In contrast, the disclosed techniques provide an ongoing evaluation of password quality that is dynamic and personalized to the user's online profile and available social network information and, in certain embodiments, as their private data.

Figure 4:
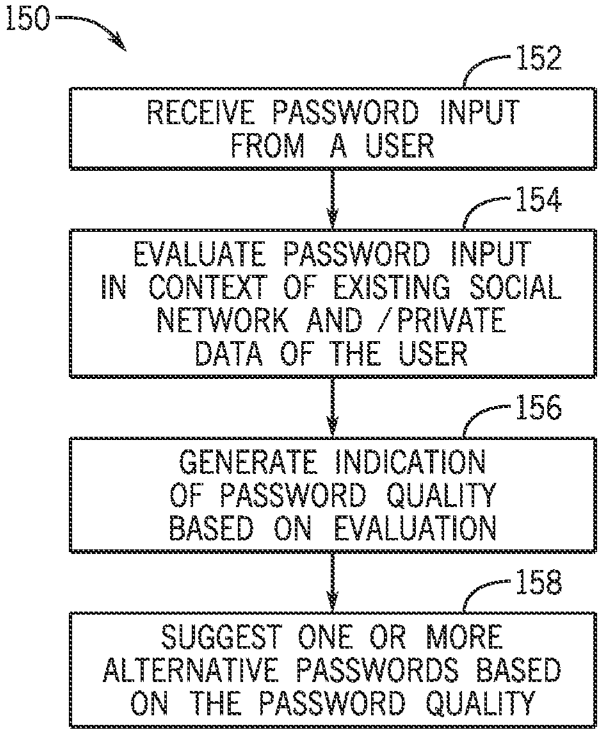
FIG. 4 illustrates a flow diagram of a method for evaluating password quality using the system of FIG. 1, in accordance with embodiments described herein.

In an embodiment, the user privacy tool 16 may evaluate user password quality based on the user's social network content and/or private data, and generate an indication based on the evaluation, as shown in the flow diagram of FIG. 4. The process 150 of password assessment may include receiving passwords from a password management tool or a password vault on a scheduled or random basis, or receiving a new password input, e.g., an existing password or a proposed password from a user, as indicated by block 152. The input may be received by the user interface 28 of the user device 14 and stored into the memory 32. Existing passwords already stored in the memory 32 may also be accessed and evaluated.

One or more passwords may be sent to the user privacy tool 16 via the communication component 34 of the user device 14 that establishes a connection with the server 12. Once the user privacy tool 16 receives the one of more passwords, it may evaluate the password input in the context of existing social network and private data of the user, as indicated by block 154. The privacy tool 16 may evaluate the password input in the context of known existing and emerging passwords that provide low protection. For example, if a popular movie is released in theaters, the privacy tool 16 may evaluate the password input in the context of the movie's title, the actors, the characters the actors portray, and any producer. Accordingly, the system 10 may receive as input popular culture information, such as movie and song titles, on a periodic basis against which the password input can additionally be assessed, in addition to the disclosed private data assessment as provided herein. Accordingly, the passwords may be assessed using both a general and a user-specific assessment. Further, the assessed popular culture information may be weighted based on the user's social network data, whereby password overlap of movies or songs present in the user's social network data are weighted against more heavily (identified as a poor password choice) in the analysis, even if present only in a few characters or as a partial word.

In order to evaluate passwords in the context of existing social network and private data, the user allows the user privacy tool 16 access to that data. This gives the user control over which data is accessible to the user privacy tool 16, because a user may only want a portion of their social network or private data to be accessible to the user privacy tool 16. The evaluation may identify similarities or overlaps between a password and certain information in the user's social network data, private data, or both. For example, if a user password is "CakeLover123", the evaluation may scan the user's social network data, private data, or both, for anything relating to "cake" or "lover" (e.g., a photo of a cake, a wedding photo, recipe exchange groups, etc.).

In an embodiment, the social content or private data extraction and flagging of the system 10 as provided herein may include text string searching or Natural Language Processing for particular words or variants of words. In an embodiment, the system 10 may perform object recognition in photographs of the user, or audio object recognition (pulling certain sounds, words, or music). For example, the system 10 may be programmed to identify certain types of preset content (car brands, animals) and identify these as potentially compromising. The system 10 may also be programmed to extract words from the passwords accessible to the system 10 and perform text string or object recognition searches for instances of those words (or images related to those words). The system 10 may further be programmed to, based on user interactions on social network platforms, such as liking or subscribing to various subgroups, identify potentially compromising actions. In a specific example, if a user password is corgis123, actions such as joining corgi-related groups, following corgi hashtags, and/or posting pictures of corgis could all be identified and flagged by the system.

Upon evaluating a user's passwords, the user privacy tool 16 may generate an indication of password quality, as indicated by block 156. The indication may be sent from the user privacy tool 16 to the server 12 and then to a user device 14. Upon receiving the indication, the user device 14 may present the indication on a user interface 28 or via an audio output component 36. The user may modify their password based on the indication. For example, if the indication indicates a weak password, the user may want to modify the password to lower the risk of potential security breaches.

Additionally, or alternatively, the user privacy tool 16 may suggest one or more strong passwords, as indicated by block 158. The one or more suggested passwords may be generated by the user privacy tool 16 using alphanumeric characters, numbers, special characters, or any combination thereof. It should be noted that the user privacy tool 16 may identify password requirements for a specific site and/or platform. Thus, the one or more suggested passwords may satisfy the password requirements for the specific site and/or platform. Further, the user may choose a new password from the one or more suggested passwords.

FIG. 5 is an example embodiment of a user interface 28 presenting a user privacy report 180 on a user device 14, as described by FIG. 3. The user interface 28 presents an image of a birthday cake with a caption saying "Happy Birthday to me!" along with the date. The user privacy report 180 is positioned adjacent to the graphic, also on the user interface 28. There may be arrows pointing from the user privacy report 180 to the corresponding flagged content 182, 184, as illustrated in FIG. 5. In this specific example, a user password available to the system 10 may include a numerical representation of the user's birthday (e.g., Jan. 1, 2020). This may provide privacy concerns because the user's account may be breached with little effort due to the poor security.

In some embodiments, the user privacy report 180 may include one or more reasons for flagging 183, 185. The one or more reasons for flagging 183, 185 may corresponds to the arrows corresponding to glagged content 182 and 184, respectively. For example, as shown in FG. 5, the reason for flagging 185 associated with arrow 184 may read "Indicates your birthday". This reason for flagging 185 may also provide one or more links to documents, and/or one or more references to where the user privacy tool 16 discovered the information.

Figure 6:
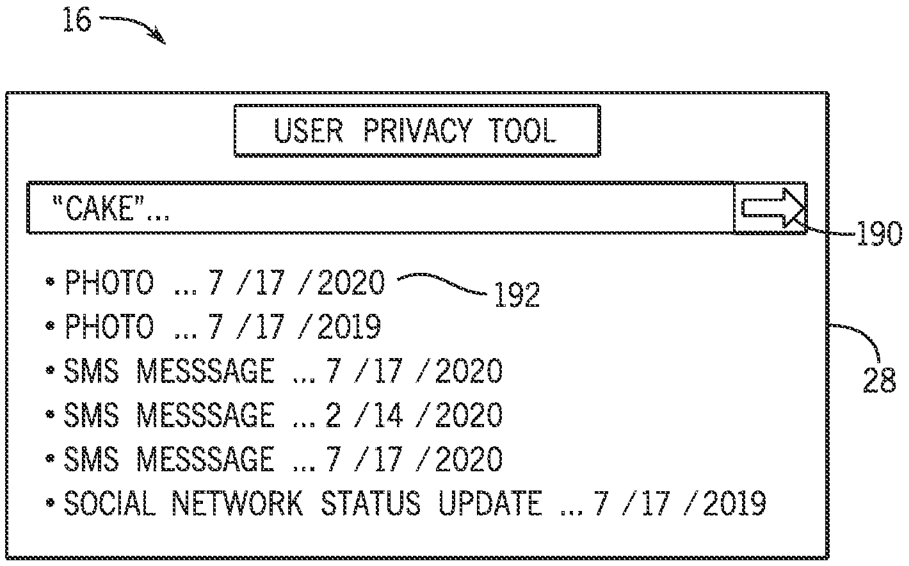
FIG. 6 illustrates an example of a user privacy tool search of user data created using the system of FIG. 1, in accordance with embodiments described herein.

FIG. 6 is a specific embodiment of the user interface 28 of the user privacy tool 16 that permits a user, e.g., via search bar 192, to search their own social network data and private data. In the example embodiment, the user privacy tool 16 is a software on the user device 14 that is stored in the memory 32 and executed by the processor 30. The user may search a keyword such as "Cake" or may search all or a portion of a proposed password via a user input on the user device 14 via the user interface 28 or audio recognition. Once the search is initiated, the processor 30 may execute code that scans the memory 32 of the user device 14 and/or the user data 22 stored in the system 10 to flag compromising data 192. The processor 30 may also generate a graphic and present that graphic on the user interface 28 as depicted in FIG. 6. The may generate search results via an audio output component 36. The results may also be stored in the memory 32 or sent to the storage 20 containing the user data 22 via an established connection to a server 12.

Based on the privacy report, the user may take certain actions. In one example, the user may change the compromised password, delete the compromising information, improve device storage security, and/or change social network privacy settings. The system 10 may then provide an updated report to assess the effect of these actions. The system 10 may operate to provide updated reports on a regular basis, e.g., every week, every month, to monitor user actions in an ongoing manner.

In the illustrated example, the search encompasses photos resident on the user device 14 that may be private photographs that are not shared to a social network. However, the photographs may be uploaded to the cloud and, therefore, may be vulnerable to privacy breaches if the third party cloud storage system experiences a privacy intrusion. Further, physical loss or theft of the user device 14 may also render such photographs or private text (SMS) messages vulnerable to privacy breaches. In addition, such private data may include emails, images, or documents (such as local documents or documents linked to document management account).

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A method of a personal data analysis and protection system comprising:

providing a user interface of a user privacy tool on a user device;

receiving, using a communication protocol from a social network, updated social network content associated with a user;

extracting, using a processor of a user privacy tool, image data and text data from the updated social network content associated with the user responsive to receiving the updated social network content;

extracting locally stored image data from the user device;

performing, using the processor of the user privacy tool, object recognition on the image data from the updated social network content and the locally stored image data to identify one or more objects having an object name that matches a text string in a set of stored passwords;

flagging, via the processor of the user privacy tool, the image data from the updated social network content or the locally stored image data having overlap with preset content associated with password privacy concerns;

evaluating, via the processor of the user privacy tool, a password quality of the user and providing an indication of the password quality on the user interface;

generating, via the processor of the user privacy tool, an indication related to the flagged image data from the updated social network content or the locally stored image data;

transmitting, using the communication protocol or a different communication protocol, the indication related to the flagged image data from the updated social network content or the locally stored image data to the user interface of a user device; and generating an additional security layer for a security tool that bypasses the overlap with the preset content.

2. The method of claim 1, further comprising performing a text search of text in the updated social network content of the user for preset terms in the preset content.

3. The method of claim 1, further comprising performing a text search of text in the updated social network content of the user for terms in existing passwords of the user.

4. The method of claim 1, wherein transmitting the indication to the user device comprises displaying the indication on a user interface of the user device, and wherein the indication is displayed on the user interface together with a display of the social network.

5. The method of claim 4, wherein generating the indication comprises generating a push notification.

6. The method of claim 4, wherein generating the indication comprises generating a user privacy report.

7. The method of claim 6, wherein generating the user privacy report comprises identifying one or more reasons for the flagging.

8. The method of claim 7, wherein the one or more reasons for the flagging are determined by the user privacy tool when generating the indication.

9. The method of claim 1, wherein generating the additional security layer comprises generating a question with an answer that avoids the extracted image data.

10. The method of claim 1, wherein the additional security layer is associated with the user device.

11. The method of claim 1, wherein the flagged image data from the updated social network content and the locally stored image data is only visible to the user of the user privacy tool.

12. The method of claim 7, wherein the one or more reasons for the flagging also comprises one or more references to where the extracted image data were discovered.

13. The method of claim 1, wherein receiving the updated social network content comprises receiving a new social network post by the user via the user device.

14. The method of claim 1, wherein receiving the updated social network content associated comprises information the user has allowed the user privacy tool to access.

* * * * *